United States Patent [19]

Burns

[11] 3,866,092

[45] Feb. 11, 1975

[54] CIRCUIT FOR ELIMINATING CONTACT BOUNCE EFFECT

[75] Inventor: Robert V. Burns, Tinley Park, Ill.

[73] Assignee: GTE Automatic Electric Laboratories Incorporated, Northlake, Ill.

[22] Filed: Oct. 15, 1973

[21] Appl. No.: 406,759

[52] U.S. Cl. .............................. 317/9 C, 317/11 R
[51] Int. Cl. .............................................. H02h 7/20
[58] Field of Search ................ 317/11 R, 11 C, 9 C; 307/92, 93, 94, 96, 132 R, 136, 134; 334/47; 328/76; 324/28 CH

[56] References Cited

UNITED STATES PATENTS 3,388,264 6/1968 Carter .................................. 307/93

FOREIGN PATENTS OR APPLICATIONS 797,380 10/1968 Canada .......................... 324/28 CH

OTHER PUBLICATIONS

F. G. Petersen, I.B.M. Tech. Disclosure Bull., "Contact Bounce Integrator," Vol. 13, No. 8, Jan. 1971.

V. Klose, I.B.M. Tech. Disc. Bull., "Bounce Eliminating Circuit," Vol. 14, No. 3, August, 1971.

*Primary Examiner*—James D. Trammell
*Assistant Examiner*—Patrick R. Salce
*Attorney, Agent, or Firm*—Robert J. Black

[57] ABSTRACT

A circuit which provides an output free from the bounce effect of mechanically operated switching contacts, which normally produce a number of make-break outputs during initial closure. A single non-inverting gain element with positive feedback provides the necessary protection.

4 Claims, 2 Drawing Figures

CIRCUIT FOR ELIMINATING CONTACT BOUNCE EFFECT

BACKGROUND OF THE INVENTION

1. Field of the Invention

This invention relates to electronic circuitry, and particularly to a circuit for protecting pulse responsive circuits from multiple make-break electrical output pulses from a set of mechanically operated switching contacts which bounce on closure.

2. Description of the Prior Art

The contacts of many forms of switches and relays frequently do not produce a clean make of break output signal. These contacts typically bounce a number of times during each make or break operation, producing not just a single closure or open but instead multiple signals.

Whenever a set of mechanical contacts which produce this bounce effect are used to control a circuit which is adversely affected by this type of signal, such as a semiconductor multivibrator circuit, register or counter, some method must be used to remove the extraneous bounce signals, to insure that a single operation of the contacts produces only one operation of the circuit being controlled.

One method of preventing bounce signals from producing false circuit operation is the use of simple integrator circuitry which provides a time constant long enough to mask the signals resulting from contact bounce.

Another commonly accepted method of correcting the effect of multiple pulses from contacts has been to use a set-reset latch circuit as shown in FIG. 1 of the accompanying drawing. The circuit is arranged to latch on the closure of the make contacts and to unlatch on the closure of the break contacts.

A pair of two input logic gates are wired with one input of each gate connected to the output of the opposite gate. The second input of the first gate is connected to the break contact to serve as a reset lead, while the second input of the second gate is connected to the make contact to serve as a set lead. This set-reset latch circuit while quite effective at removing bounce signals, has the disadvantage of requiring pull up resistors at those inputs connected to the switching contacts. In order to provide good noise immunity these resistors must be low in value, and thus they consume some power.

Accordingly it is the object of this invention to provide a circuit which eliminates multiple pulses caused by mechanical switching apparatus contact bounce. The present circuit requires a minimum number of components, provides superior noise immunity and consumes a minimum amount of operating power.

SUMMARY OF THE INVENTION

The present invention is a circuit which eliminates multiple output pulses caused by switching contact bounce. The present circuit consists of a non-inverting logic gate or amplifier with a resistor connected from the output to the input. This resistor provides positive feedback to cause the gate or amplifier input to latch to its output either in a high state or a low state. The input when connected to ground through a break contact causes the output to be low, providing a low signal to the input through the feedback path. When the break contacts open the input is still held low, by means of the feedback path. When the make contacts, which are connected to the supply voltage close or operate, the input will then go high, which will cause the output to also go high, and in turn over the feedback path maintain the input at the high signal condition, even if the make contacts applying the voltage bounce open after having initially closed. Since the input and output of the gate or amplifier are both high or alternately are both low, no voltage drop exists across the resistor and thus no power is consumed by the resistor after the gate has reached equilibrium.

The circuit of the present invention requires only one input, which is either connected to a first potential value with the break contacts closed and alternately to a second value of potential with the make contacts closed, providing excellant noise immunity and permitting the use of long circuit leads from the switching contacts to the input of the gate of amplifier circuit. The only time the gate or amplifier input is exposed is during the transfer and bounce periods of the contacts. Since no power is consumed by the resistor a very low value of resistance may be used to prevent noise from causing false outputs from the device.

DESCRIPTION OF THE PREFERRED EMBODIMENT

Figure 1:
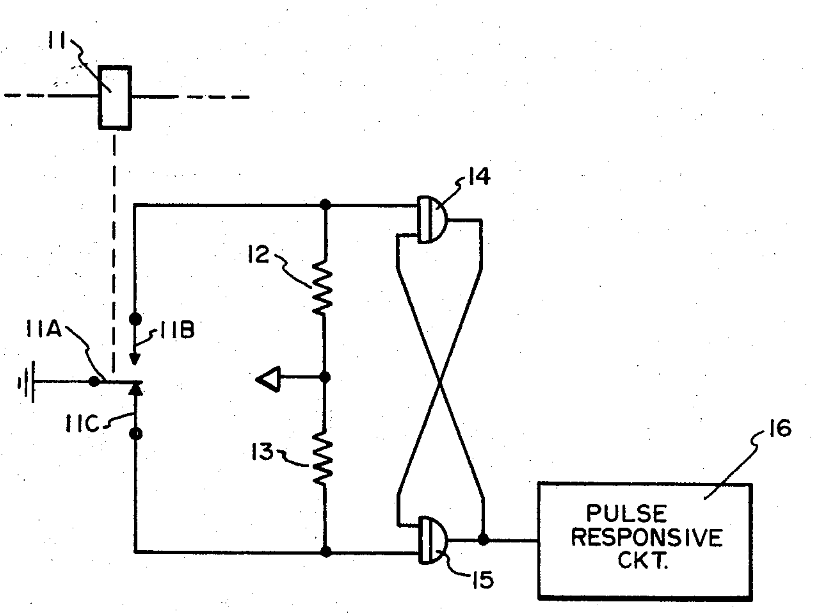
FIG. 1 (PRIOR ART)
FIG. 1 is a circuit diagram of a conventional method found in the prior art to eliminate the effects of contact bounce.
Figure 2:
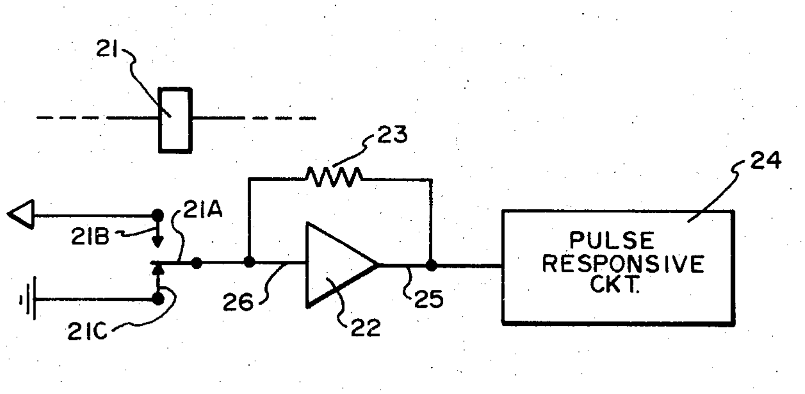
FIG. 2 is a diagram of a circuit for eliminating contact bounce effect in accordance with the present invention.

Referring now to FIG. 2 a set of contacts consisting of armature 21A make contact 21B and break contact 21C are shown. These contacts are operated from a switching device such as relay 21. In the non-operated position ground is shown connected through the break contact and armature to the input of gate 22. When relay 21 is operated battery through make contact 21B and armature 21A will be applied to the input of gate 22. Gate 22 is a non-inverting gain device who's output 25 will always follow its input 26. When the input 26 is high the output 25 will also go high, when the input 26 is low the output 25 will also go low. Connected to the output 25 of gate 22 a pulse responsive circuit 24 is shown. This circuit might be a semiconductor multivibrator, register, counter or similar circuit, whose operation is adversely effected by the receipt of multiple input pulses.

A resistor 23 is connected from the output 25 to the input 26 of gate 22. This connection which forms a positive feedback path, maintains gate 22 in either its low or high state during the transition when armature contact 21A is not making contact with either break contact 21C or make contact 21B. The action of the gain device which forms gate 22, in combination with the feedback path including resistor 23 is to remain in whichever state it was when its input 26 was disconnected by the opening of armature contact 21A.

In environments where power consumption, circuit simplicity and the quanity of circuits utilized are important considerations, an RCA Type CD-4050 non-inverting hexbuffer and 6 resistors powered from a three volt source, will provide 6 bounce effect eliminator circuits, with a steady state power consumption of less than 0.03 microwatts. The value of resistor 23 may be as low as a direct connection between output 25 and input 26, or as high as 100 megohms when complimentary metallic oxide silicon transistor gates are employed. It has been found that low values provide the best noise immunity, and yet consume power only during the turn "on" or turn "off" time of the gain device 22.

It is obvious that from the circuit described only single continuous pulses of one characteristic at a time are supplied to the pulse responsive circuit 24.

While but a single embodiment of the present invention has been shown it will be obvious to those given in the art that numerous modifications may be made without departing from the spirit and scope of the present invention, which is limited only by the claims appended hereto.

What is claimed is:

1. Means for protecting pulse responsive circuits from multiple output signals caused by the bounce of mechanically operated switching contacts, comprising: a gain producing device comprising an amplifier including, an input alternately connectable through mechanically operable switching contacts to a source of signals of a first characteristic, and a source of signals of a second characteristic, and an output connectable to a pulse responsive circuit, said gain device initially operated in response to connection through said contacts to said source of signals of said first characteristic, to produce at said output a single signal of said first characteristic, and further operated in response to connection through said contacts to said source of signals of said second characteristic to produce at said output a single signal of said second characteristic; and a feedback circuit connected from the output to the input of said gain device, said feedback path maintaining said gain device operated to continue production of a single signal at said output of said gain device, of the same characteristic as that of the signal source last connected to said gain device input.

2. Means for protecting pulse responsive circuits as claimed in claim 1 wherein: said signals of a first characteristic are of a first polarity of potential, and said signals of a second characteristic are of a second polarity of potential.

3. Means for protecting pulse responsive circuits as claimed in claim 1 wherein: said feedback circuit is a positive feedback loop including a resistor therein.

4. Means for protecting pulse responsive circuits as claimed in claim 1 wherein: said gain producing device is a non-inverting logic gate.

* * * * *